United States Patent [19]
Valibouse et al.

[11] 3,789,988
[45] Feb. 5, 1974

[54] APPARATUS FOR REMOVING SURFACE POLLUTANTS FROM WATER AND OTHER LIQUIDS

[75] Inventors: Bernard Valibouse, Grenoble; Jacques Pichon, Saint Martin-d'Heres, both of France

[73] Assignee: Societe Grenobloise d'Etudes et d'Applications Hydrauliques (Sogreah), Grenoble (Isere), France

[22] Filed: Mar. 14, 1973

[21] Appl. No.: 341,070

Related U.S. Application Data

[63] Continuation-in-part of Ser. No. 185,719, Oct. 1, 1971, abandoned.

[30] Foreign Application Priority Data
Nov. 6, 1972    France ............................... 7239209
Oct. 2, 1970    France ............................... 7036478

[52] U.S. Cl. ............................... 210/242, 210/512
[51] Int. Cl. ........................................... E02b 15/04
[58] Field of Search .............. 210/84, 170, 242, 512, 210/DIG. 21

[56] References Cited
UNITED STATES PATENTS
3,656,619    4/1972    Ayan et al. ..................... 210/512 X
3,493,120    2/1970    Milnea ............................... 210/512
3,595,392    7/1971    Maakel ............................ 210/84 X
3,527,348    9/1970    Lalonme et al. ...................... 210/84
3,666,099    5/1972    Galicia ............................. 210/242 X Primary Examiner—John Adee
Attorney, Agent, or Firm—John J. Hart et al.

[57] ABSTRACT

The apparatus disclosed herein for removing layers of pollutants, such as oil, floating on a heavier liquid, especially water, depends for its operableness on the effect of the relative displacement speed of the heavier liquid and the overlying pollutant. Such relative speed is used to direct the removed layer of heavier liquid and pollutant, by tangential introduction, into at least one cyclone chamber wherein the induced rotation of the removed materials is caused as to create a whirlpool area in which the pollutant is concentrated. In the central portion of such concentration, the pollutant is extracted through a pipe fitting in the axis of and crossing the ceiling of the cyclone. The centrifuged water, free of pollutant, is discharged at the end of the cyclone.

12 Claims, 9 Drawing Figures

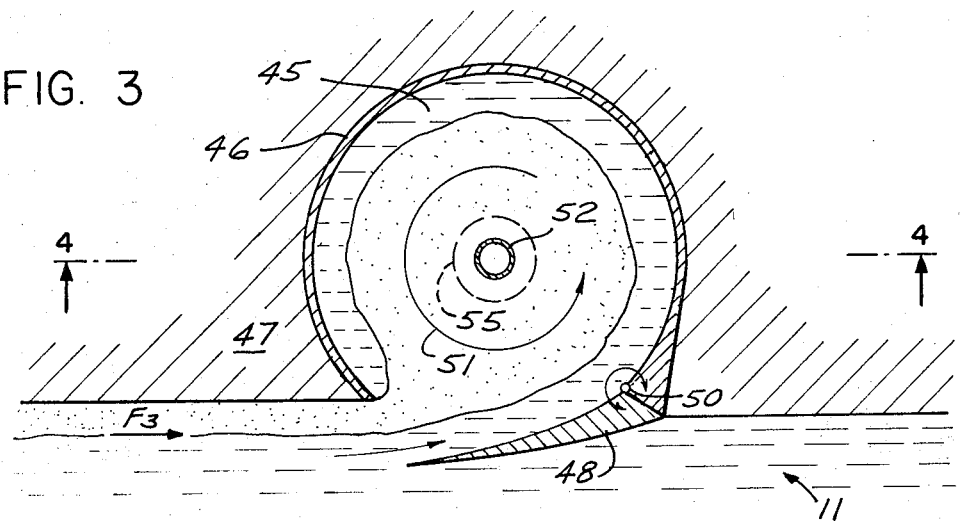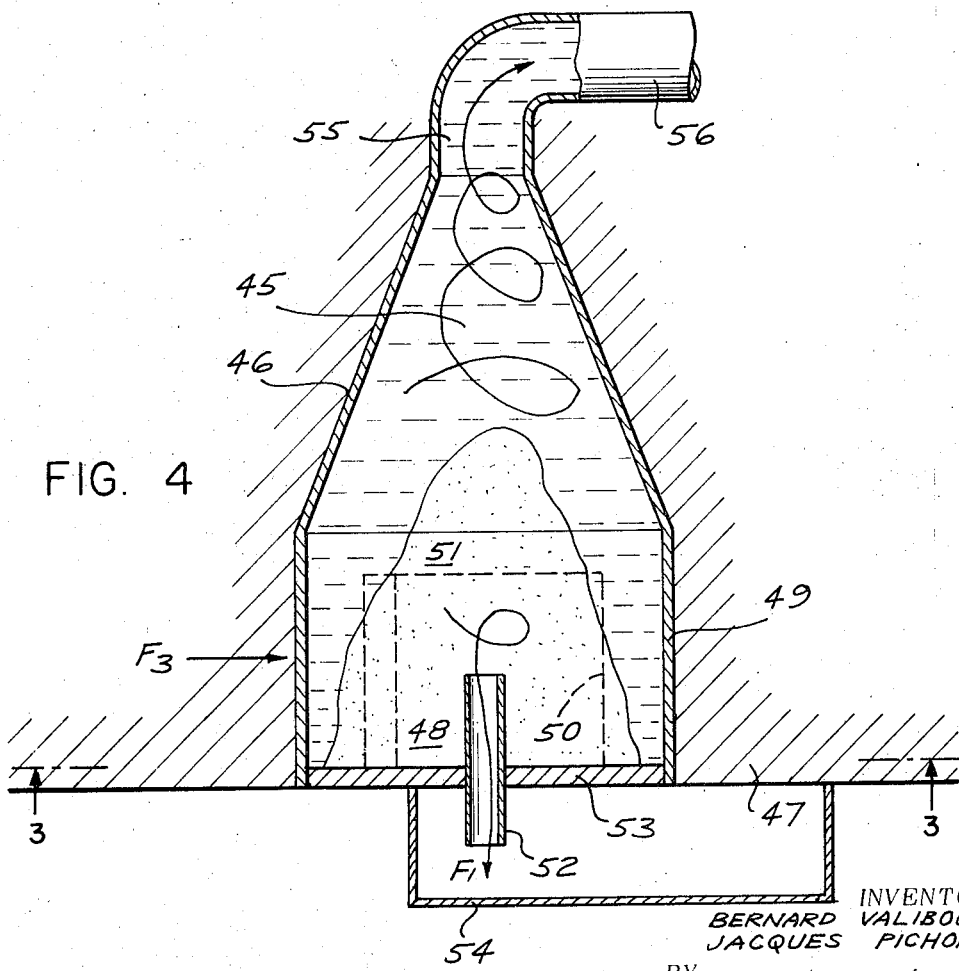

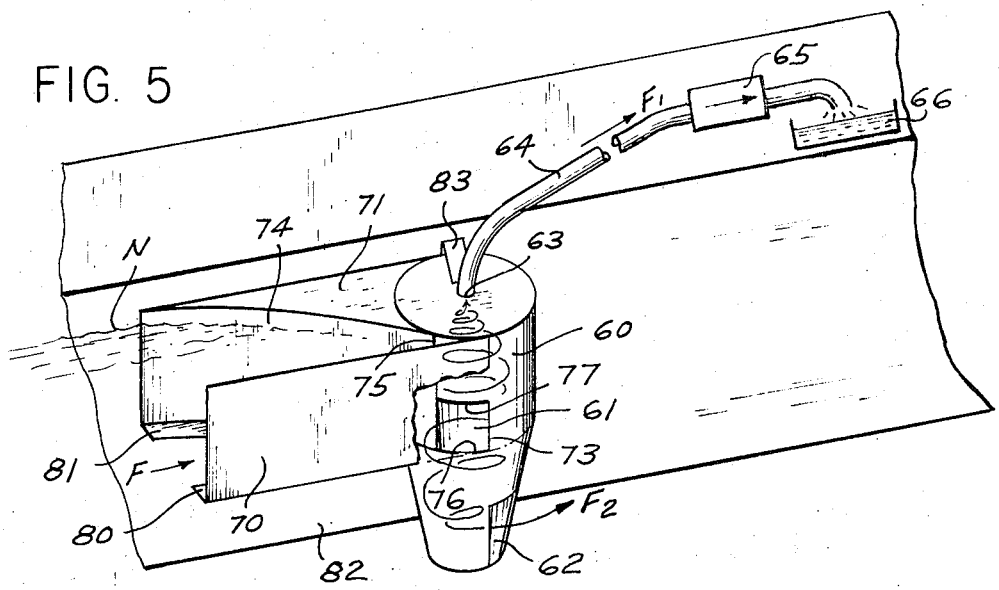
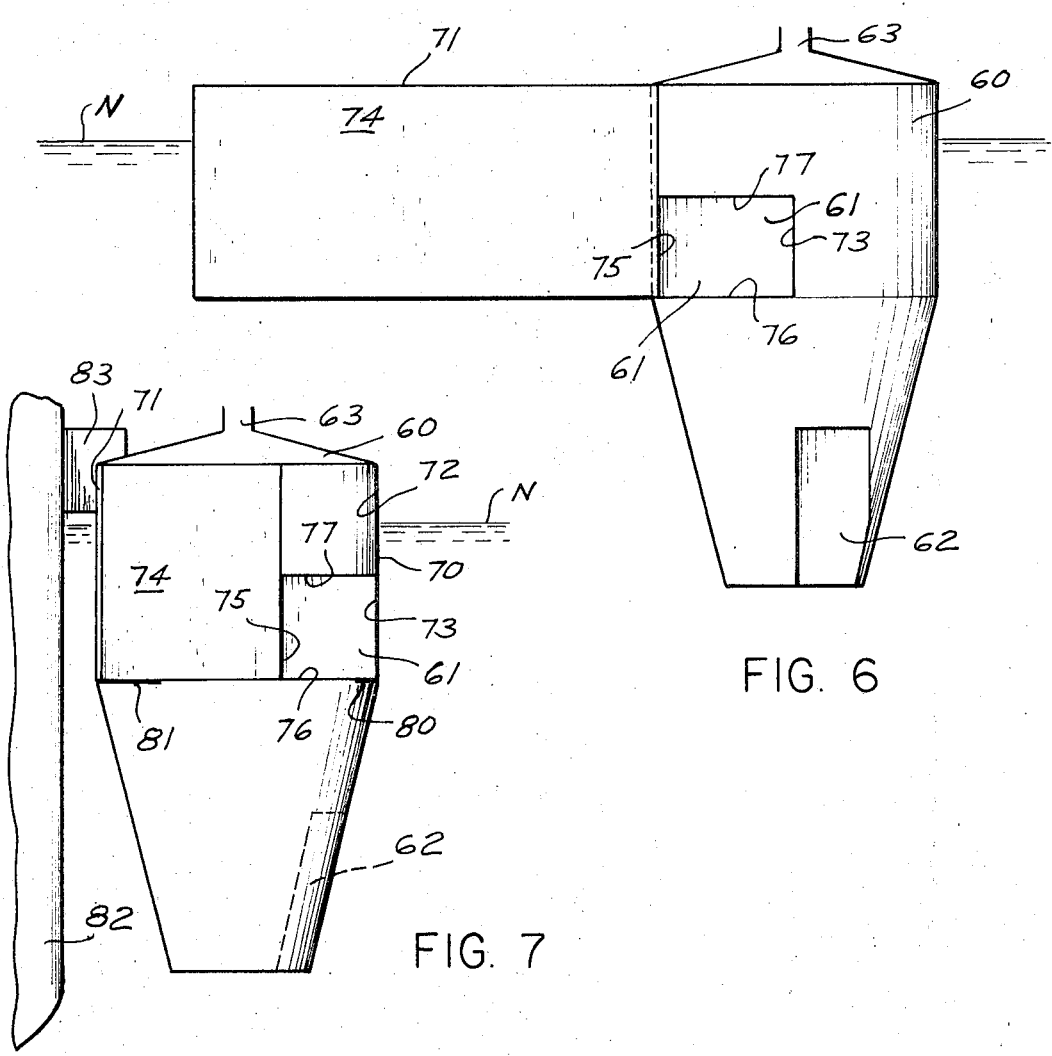

3,789,988

APPARATUS FOR REMOVING SURFACE POLLUTANTS FROM WATER AND OTHER LIQUIDS

This application is a continuation-in-part of application Ser. No. 185,719 filed by the applicants on Oct. 1, 1971 now abandoned.

THE INVENTION

The present invention is concerned with equipment for removing layers of floating pollutant products from heavier liquids, particularly oil from a body of water.

The process may be practiced by using equipment towed or pushed by a ship, or mounted on or built into a ship or a floating carrier, or established in a static condition in a moving body of water such as a river. Whichever manner in which the equipment is used, a top layer of suitable thickness of the body of water is collected by relying solely on the effect of the relative speed of displacement of the water and the floating pollutant. The relative displacement speed of the removed layer of water and floating pollutant is used to direct such materials into one or several cyclone chambers through a tangential inlet so as to cause within each such chamber a rotation of such materials such as to create a whirlpool area in which the lighter pollutant is concentrated. The pollutant is extracted from the central portion of such area through a fixed pipe whose axis is coincident with that of the cyclone chamber and which transverses the ceiling of such chamber. The centrifuged water, freed of the pollutants, is discharged through the tip of the cyclone chamber. One advantage of this process is that its efficiency increases as the relative displacement speed increases, thereby enabling rapid purification of a stretch of water. It is to be realized however, that this speed must be compatible with the behavior of the apparatus in a particular sea area.

In accordance with one form of the invention, the apparatus or unit for carrying out the process may include two walls forming a convergence at the place of entry of the pollutant and water into the cyclone chamber, or chambers. At the downstream end of the convergence formed between such walls, there may be provided a horizontally pivotal articulated blade whose outer, upper end forms a scoop which cuts from the body of water a top layer of suitable depth containing both water and the floating pollutant, and channels it into chambers forming vertical axis cyclones. These cyclone chambers are constructed so as to form whirlpool areas having vertical axes of rotation and in the upper portions of which the pollutant is concentrated. The upper part of the chambers are each formed by a wall provided with a central opening in which is fitted a vertical pipe which penetrates to a considerable depth into its associated chamber and extends slightly above such wall. The pollutant concentrated in the upper portion of each cyclone chamber is extracted completely free of water through its associated pipe and is discharged into and stored in a recipient which is common to both chambers. The water leaving the lower point or tip of each chamber is discharged through a pipe back into the body of water.

In accordance with another form of the invention the apparatus is constituted of a single cyclone body having associated therewith inlet means consisting of two vertical walls defining a tapered area leading the mixture to the inlet orifice of the cyclone. This compact unit has the advantage that it can readily be mounted on the sides of a ship, or on a stationary float in a natural or artificial flow of water.

It will be appreciated that the above described arrangements are especially appropriate for equipment which will, during its usage, be towed or pushed by a boat, or built into or fitted to the sides of a boat, or be statically fitted in a river. When apparatus embodying the invention is to be used with hydropters or hydrofoils where high displacement speeds are developed, horizontal axis instead of vertical axis cyclones may be employed. Such horizontal axis cyclones would in accordance with the invention have tangential entries fitted with scoops arranged to penetrate the layer of water and pollutant and channel the latter into such cyclones. The operation within these horizontal cyclone chambers, however, as well as the discharge of the pollutant and of the water freed from the pollutant, would be substantially similar to that described in connection with the vertical cyclone chambers.

Four embodiments of the above discussed types of apparatus are shown by way of example in the accompanying drawings, in which FIG. 1 is a vertical sectional view of equipment having two chambers formed to provide two vertical axis cyclones; the view being taken along the line 1—1 of FIG. 2;

FIG. 3 is a vertical sectional view of equipment having two chambers formed to provide two horizontal axis cyclones; the view being taken along the line 3—3 of FIG. 4;

FIG. 4 is a horizontal sectional view taken along the line 4—4 of FIG. 3;

FIG. 5 is a perspective view of a compact unit embodying the invention;

FIG. 6 is a vertical sectional view of the unit of FIG. 5, the section being taken along the line 6—6 of FIG. 8 and omitting the tangential guide wall of the unit to show the inlet opening of the cyclone;

FIG. 7 is an end view of the unit of FIGS. 5 and 6 and illustrates one method of mounting it on a ship;

Figure 1:
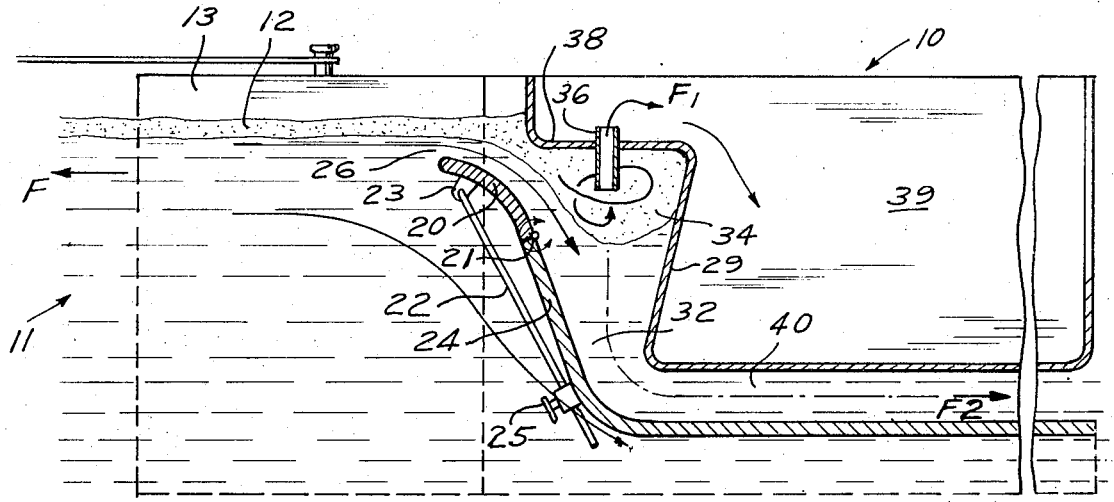
Figure 2:
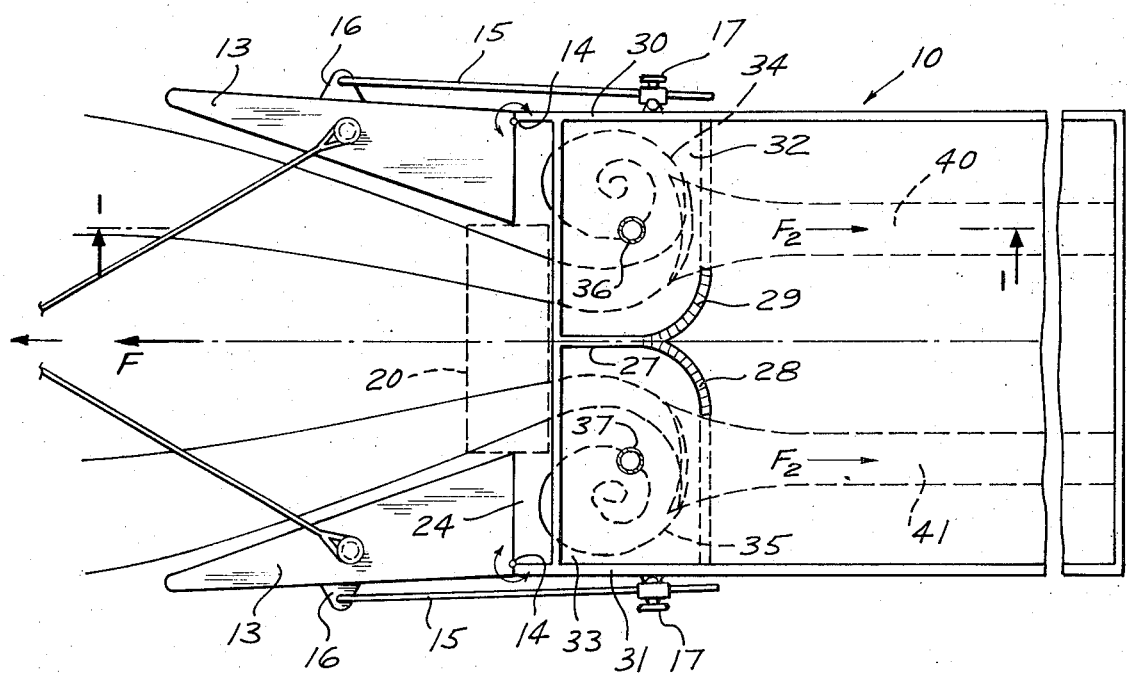
FIG. 2 is a plan view of the equipment shown in FIG. 1.

The equipment shown in FIGS. 1 and 2 of the drawings is composed of a unit 10 constructed to be towed through a body of water 11 in the direction indicated by the arrow F and into an area of the surface of such water body that is to be cleaned of a surface floating layer 12 of pollutant, for example, a liquid such as oil. The unit may be towed by providing suitable means thereon in a known manner by which tow ropes may be attached thereto for towing the same by a boat. The unit 10 is provided with two forwardly projecting vertical walls 13,13 shaped to form a convergence for directing the skimmed pollutant and water into the entry end of the body of the unit. The walls 13,13 are pivotally connected to the unit body by vertical shafts 14,14 and may be adjustably positioned relative to the unit body to further increase the pollutant intake area of the unit by adjustment of two rods 15,15 which are pivotally connected at their outer ends to lugs 16,16 provided on the walls 13,13 and which are releasably secured to the unit body by suitable fastening devices 17, 17 mounted thereon.

The entry end of the unit body is located at the downstream end of the convergence formed by the two forwardly projecting vertical walls 13,13 and comprises a blade 20 which is mounted for pivotal movement on a horizontal shaft 21. It will be noted in FIG. 1 that the hinged end of the blade 20 is located substantially below the surface of the water body 11 and that the blade curves upwardly from its hinged end in an arcuate manner to a given point below the surface of the water. The position of the outer upper end of the blade 20 may be varied by the adjustment of a rod or rods 22 pivotally connected to a lug or lugs 23 provided on the blade 2 and adjustably secured to the entry or front wall 24 of the unit by suitable fastening devices 25 mounted thereon. It will thus be understood that the lip of the blade 20 forms a scoop which skims a selected thickness of a mixture of pollutant and water from the top of the body of water 11 using solely the speed of the unit relative to the body of water. The thickness of the skimmed mixture will correspond to the adjustment of the height of the blade 20 and such mixture will be constituted of a portion of the pollutant layer 12, and the part of the layer 26 of the water underlying such portion of the pollutant layer 12. It will also be noted in FIGS. 1 and 2 of the drawings that the blade 20 and front wall 24 of the unit, together with suitably configured wall portions 27, 28, 29, 30 and 31 form two vertical axis cyclones 32 and 33, and that the width of the blade 20 and the relative speed is such, that the mixture of pollutant and water is tangentially induced into such cyclones 32 and 33 to cause rotation of such mixture. This is indicated by the dotted portions of the flow lines in FIG. 2, which show the liquid flowing into the two cyclones tangentially to the two faces of the central wall portion 27 and then being caused to whirlpool in opposite directions by the walls forming such cyclones. As a result of the rotation of the liquid mixture in the cylones 32 and 33, there are created in the whirlpool areas thereof central concentrations 34 and 35 of the pollutant. The volume of the central concentrations 34 and 35 will increase with an increase in the displacement speed of the equipment relative to the body of water. The pollutant liquid which constitutes the central zones 34 and 35 of the cyclones, is completely separated from the underlying water through pipes 36,37 located in the central portions of the ceilings 38, in FIG. 1, of the cyclones. This discharge of the pollutant from the cyclones is indicated in FIG. 1 of the drawings by a series of arrows F1 which show the pollutant being sucked up through the pipe 36 and discharged over the ceiling wall 38 of the cyclone chamber and into a storage chamber 39 formed in the unit. As previously stated the axes of the vertical pipes 36,37 are coincident with the axes of the cyclones 32,33. As shown in FIG. 1, the pipes 36,37 extend for a substantial distance toward the bottom of the cyclone chambers and project only slightly beyond the upper surface of the ceiling walls 38. In certain situations, the discharge through the pipes 36,37 may be increased by associating them with suction pumps in a manner known to the art.

The water that collects in the bottom of the cyclones 32 and 33 is sucked off and discharged through pipes 40 and 41 which respectively communicate with the tips of such cyclones and conduct the water in the direction of the arrows F2 toward the rear of the unit for reentry into the body of water 11.

As has been previously indicated, the above described apparatus instead of being towed may be fitted to the front or rear of a ship. In the latter case, the ship would be moved in reverse to remove the layer 12 of floating polluting liquid. Where it is necessary to clean a moving body of water, such as a river, of a floating pollutant, the apparatus could be placed in the water course so that the river current speed is utilized in the introduction of water and pollutant into the equipment which would operate in the manner above described to remove the pollutant from the water.

FIGS. 3 and 4 of the drawings show how the unit may be constructed to provide horizontal axis cyclones for separating the pollutant liquid from the water. This type of construction is preferred in units which are moved at high speed, such as when the units are built into hydropters or hydrofoils. As is indicated in FIG. 3, the mixture of water and pollutant skimmed from the surface of the body of water 11 being cleaned is induced at high speed in the direction of the arrows F3 into at least one horizontal axis cyclone provided in the cleaning apparatus fitted in or built into the ship. When several horizontal axis cyclones are used they are grouped together in the same cleaning apparatus. FIGS. 3 and 4 of the drawings show a horizontal axis cyclone formed by cleaning apparatus 46 built into a high speed boat 47. As in the previously described apparatus the water and pollutant mixture is skimmed from the body of water by a scoop 48 hingedly connected to the enlarged entry end 49 of the cyclone by a horizontal shaft 50. The scoop is adjustable about shaft 50 to vary the thickness of the liquid being skimmed off the top of the water body 11 by any suitable means, such as the members 22,23 and 25 shown in FIG. 1 of the drawings. It will be understood that due to the high induction speed of the skimmed liquid mixture, the effect of gravity on the two components thereof in the cyclone becomes insignificant compared with the centrifugal action. Thus, a horizontal axis control zone 51 containing the pollutant liquid is formed in the cyclone, while the water is centrifuged toward the walls of the cyclone. As in the previously described construction, the pollutant centrally concentrated in the cyclone is drawn off through a pipe 52 fixed in the axis of the cyclone and projecting through the cyclone end wall 53. The pollutant sucked out through the pipe 52 is discharged into a suitable receptacle 54 forming part of the cleaning apparatus, as indicated by the arrow F1 in FIG. 4. The water forced toward the tip end 55 is discharged into a suitable pipe 56 which returns it to the body of water.

In FIGS. 5 to 9 of the drawings are shown compact units embodying the invention and which are particularly suitable to be mounted on floats, or on either side of a ship, such as a trawler, or a light tanker. As is shown in FIGS. 5-8 of the drawings, such a compact unit is constituted of a cyclone 60 of the type previously described and having an inlet orifice 61, a clear water outlet 62 at the base of the cyclone and a pollutant outlet 63 at the upper portion of the cyclone. The upper outlet 63 is equipped with a pipe 64 which extends axially into the cyclone in the manner of the pipe 36 shown in FIG. 1 of the drawings. The pipe preferably is connected to suitable pumping means 65 for delivering the pollutant to a stocking reservoir 66 mounted on the float or ship to which the unit is attached.

Mounted on the cyclone 60 are two spaced, solitary walls 70, 71 of substantially equal length and designed to guide the pollutant-water mixture into the inlet orifice 61 so as to produce rotational movement of the mixture within the cyclone by the relative motion of the cyclone and the water. Wall 70 is a linear vertical wall providing a plane vertical guide surface 72 which is tangential to the casing wall of the cyclone 60 at one vertical edge 73 of the orifice 61. Wall 71 is spaced from wall 70 and has an inner curved surface 74, which at its outer end is spaced from surface 72 a distance approximately the same as the transverse diameter of the cyclone, and which at its inner end coincides with the other vertical edge 75 of the orifice 61. As shown more clearly in FIG. 8, the orifice edge 75 is spaced from the surface 72 a distance less than the transverse radius of the cyclone. As indicated in FIGS. 6 and 7, the lower edge 76 of the orifice 61 and the lower edges of the vertical plane surface 72 and the vertical curved surface 74 are substantially in the same horizontal plane. The upper orifice edge 77 is located approximately midway of the height of the plane surface 72. The walls 70 and 71 preferably are provided along their lower edges with inturned flanges 80 and 81, respectively. The upper surfaces of the flanges 80,81 are perpendicular to the associated side surfaces 72 and 74, respectively, and function in the nature of deflectors or guides; cooperating with the side surfaces 72 and 74 to guide the flow of liquid to the inlet orifice 61. As illustrated, the deflector wall 80 may be of substantially equal width throughout its length, while deflector wall 81 may be made progressively smaller in width toward the inlet orifice 61.

Figure 8:
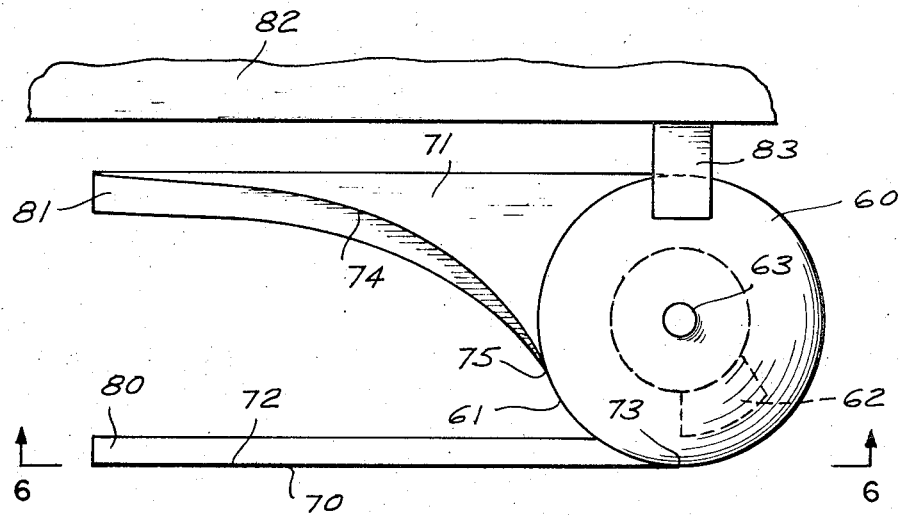
FIG. 8 is a top plan view of the parts shown in FIG. 7.

As shown in FIGS. 5, 7 and 8, the unit may be attached to one side of a float or ship 82, by bracket means 83 secured to the upper end of the cyclone casing. The bracket means 83 may form part of the unit and be attached to the boat in any suitable manner. The unit must always be attached to the boat so that the inlet orifice 61 is always below the normal free surface of the body of water and the cyclone is filled with liquid about to the level N indicated in FIGS. 5 to 7 of the drawings.

The operation of the unit of FIGS. 5–8 is similar to that explained with reference to the cyclones shown in FIGS. 1 and 2 of the drawings and need not be repeated.

Figure 9:
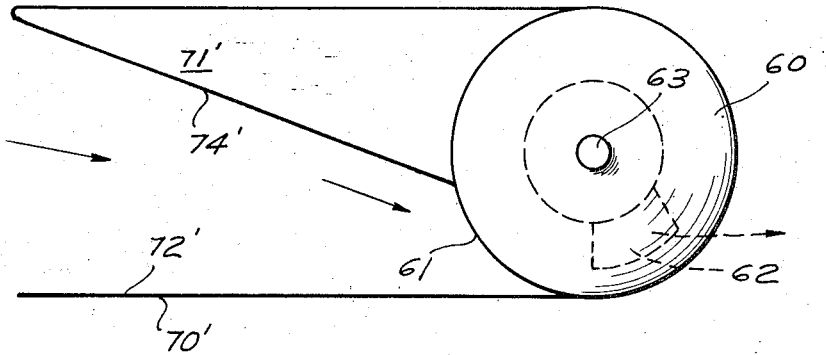
FIG. 9 is a top plan view of a modified form of the unit of FIGS. 5-8.

The unit shown in FIG. 9 of the drawings, is constructed similarly to the unit illustrated in FIGS. 5–8 and above described except that the converging walls 70',71' are not provided with deflector walls 80 and 81, respectively, and the inner guide surfaces 72',74' of walls 70',71', respectively, are both straight planar surfaces. In all other respects the construction of the unit of FIG. 9 is similar to that of the unit of FIGS. 5 to 8 and it will operate in a manner similar to the latter.

While we have hereinabove described and illustrated in the drawings, preferred methods by which the invention may be practiced, it will be understood that variations therein may be made without departing from the spirit of the invention, or the scope of the appended claims.

What is claimed is:

1. Apparatus for the removal of a pollutant floating on a body of water, comprising a cyclone device adapted to be supported in relative movement with the body of water to receive the pollutant and water and when so supported in the body of water with a sufficient displacement speed therebetween being capable of receiving a water-pollutant mixture directly therein and of causing the rotation of such mixture therein to a degree sufficient to create a separation of the pollutant from the water, said cyclone device comprising a casing defining a cyclone chamber free of internal rotatable vanes and having an enlarged end and a reduced end, a side of the enlarged end of said chamber being exposed to entry of the relatively moving body of water through a large entry opening located under the free surface of the body of water for receiving directly into said chamber a water-pollutant mixture from such body of water, said casing including a solitary wall located externally of said enlarged end and associated with one side of said entry opening and provided with a mixture directing surface disposed in substantial parallelism with the longitudinal axis of said chamber, said solitary wall projecting outwardly from said enlarged end in opposed relation to the direction of entry of the water-pollutant mixture and said directing surface of said wall being generally inclined outwardly away from the other side of said opening so as to direct the water-pollutant mixture into said enlarged end to one side of said longitudinal axis and to coact with the interior surface of said casing defining said enlarged end to create within said chamber using solely the effect of such displacement speed on the entering mixture, a whirlpool condition capable of concentrating the pollutant in the central area of the enlarged end of said chamber, means for extracting the pollutant from such central area and through the enlarged end of the cyclone chamber along the longitudinal axis of such chamber, means for collecting the extracted pollutant, and means for returning the pollutant free liquid from the reduced end of said chamber to said body of liquid.

2. Apparatus as defined in claim 1, in which said directing surface of said solitary wall is concavely-shaped outwardly from said one side of said entry opening.

3. Apparatus as defined in claim 1, in which casing includes a wall in the enlarged end of said chamber having a mixture directing surface concavely curved around the longitudinal axis of said chamber, and a plane mixture directing surface extending outwardly from the entry end of said curved surface and disposed so that the surface of said solitary wall diverges outwardly therefrom in spaced relation and against which the latter directs the water-pollutant mixture to be directed by said plane surface onto said concavely curved surface and around said longitudinal axis of said chamber.

4. Apparatus as defined in claim 1, including a second solitary wall located externally of said enlarged end and associated with the other side of said entry opening, said second solitary wall having a mixture directing surface disposed in substantial parallelism with the longitudinal axis of said chamber and together with the mixture directing surface of said first mentioned solitary wall forming a converging passage for the water-pollutant mixture directed thereby to said entry opening.

5. Apparatus as defined in claim 4, in which the mixture directing surface of said second solitary wall is substantially tangential to the casing wall of said cyclone at said other side of said entry opening.

6. Apparatus as defined in claim 4, in which said sides of said entry opening have a length substantially less than the transverse dimensions of said solitary walls and in which said entry opening is spaced from said extracting means and from those longitudinal edges of said solitary walls that are adjacent to said extracting means.

7. Apparatus as defined in claim 4, in which that end edge of said entry opening spaced furthest from said extracting means is adjacent to one longitudinal edge of each of said solitary walls, and including deflecting means mounted on said one longitudinal edges of said solitary walls and coacting with the latter to direct the water-pollutant mixture to said entry opening.

8. Apparatus as defined in claim 7 in which said deflecting means comprises flanged walls projecting in opposed relation from said one longitudinal edge of said solitary walls and having mixture directing surfaces perpendicular to the mixture directing surfaces of said solitary walls.

9. A unit mountable on a hull for the removal of pollutant floating on a body of water, comprising a cyclone device having a casing defining a cyclone chamber free of internal rotatable vanes and including an enlarged end and a reduced end, a side of the enlarged end of said chamber having an opening for entry of a water-pollutant mixture from the body of water directly into said chamber, a pair of solitary walls located externally of said cyclone device and connected at one end thereof to said cyclone casing at the sides of said entry opening, said solitary walls projecting outwardly from said entry opening in spaced relation and having opposed mixture directing surfaces disposed in substantial parallelism with the longitudinal axis of said chamber and inclined relative to each other to provide a converging passageway to said entry opening, said solitary walls coacting with the interior surface of said casing, when said unit is mounted on a hull with said solitary walls projecting from said cyclone casing in opposed relation to the direction of entry of the water-pollutant mixture and with said entry opening submerged below the free surface of the body of water, to create within said chamber using solely the displacement speed of the entering mixture relative to said cyclone device, a whirlpool condition capable of concentrating the pollutant in the central area of the enlarged end of said chamber, outlet means at the enlarged end of the cyclone chamber for removing the pollutant from such central area thereof along the longitudinal axis of such chamber, and an outlet in the reduced end of said chamber for the discharge of the pollutant free liquid.

10. A unit as defined in claim 9, in which the directing surface of one of said solitary walls is tangential to the casing wall at a side edge of said entry opening and disposed as a whole at right angles to a radial plane containing the longitudinal axis of said chamber and said opening side edge.

11. A unit as defined in claim 10, in which the directing surface of the other of said solitary walls is concavely shaped outwardly from the other side of edge of said entry opening.

12. A unit as defined in claim 9, including deflector walls projecting in opposed relation from the longitudinal edges of said solitary walls spaced furthest from said outlet means, said deflector walls having mixture directing surfaces perpendicular to the mixture directing surfaces of said solitary walls.

* * * * *